United States Patent
Eigenfeld et al.

(10) Patent No.: US 10,016,970 B1
(45) Date of Patent: Jul. 10, 2018

(54) FLEXOGRAPHIC-PRINTABLE MAGNET SYSTEMS

(71) Applicant: Magnum Magnetics Corporation, Marietta, OH (US)

(72) Inventors: Peter Eigenfeld, Marietta, OH (US); Cameron Daniel Fouss, Marietta, OH (US); Joseph B. Stout, Williamstown, WV (US); Ryan Watters, Marietta, OH (US)

(73) Assignee: MAGNUM MAGNETICS CORPORATION, Marietta, OH (US)

(*) Notice: Subject to any disclaimer, the term of this patent is extended or adjusted under 35 U.S.C. 154(b) by 58 days.

(21) Appl. No.: 14/137,019

(22) Filed: Dec. 20, 2013

Related U.S. Application Data (60) Provisional application No. 61/815,795, filed on Apr. 25, 2013, provisional application No. 61/740,246, filed on Dec. 20, 2012.

(51) Int. Cl.
| | |
|---|---|
| *B41F 13/54* | (2006.01) |
| *B42D 15/04* | (2006.01) |
| *B41M 5/00* | (2006.01) |
| *B32B 7/00* | (2006.01) |
| *G09F 3/02* | (2006.01) |
| *H01F 7/02* | (2006.01) |

(52) U.S. Cl.
CPC ............ *B41F 13/54* (2013.01); *B32B 7/00* (2013.01); *B41M 5/00* (2013.01); *B42D 15/045* (2013.01); *C09J 2201/128* (2013.01); *C09J 2201/134* (2013.01); *G09F 2003/0245* (2013.01); *H01F 7/0215* (2013.01); *Y10T 428/1481* (2015.01)

(58) Field of Classification Search
CPC ...... B42D 15/045; H01F 7/0215; B41M 5/00; Y10T 428/1481; C09J 2201/128; C09J 2201/134; C09J 2201/0225; G09F 2003/0245; B32B 7/00
See application file for complete search history.

(56) References Cited

U.S. PATENT DOCUMENTS

| | | | |
|---|---|---|---|
| 5,863,076 A * | 1/1999 | Warther | 283/74 |
| 6,068,037 A * | 5/2000 | Yeager et al. | 156/566 |
| 6,153,279 A | 11/2000 | Charley | |
| 6,472,037 B1 | 10/2002 | Kane | |
| 6,549,131 B1 * | 4/2003 | Cote | G06K 19/06196 194/213 |
| 6,718,673 B2 | 4/2004 | Ray, III et al. | |
| 7,029,001 B2 * | 4/2006 | Crum | 270/52.08 |
| 7,278,230 B2 | 10/2007 | Ray, III et al. | |
| 2001/0042590 A1 | 11/2001 | Neuburger | |
| 2002/0084880 A1 * | 7/2002 | Barbera-Guilem | B03C 1/288 336/200 |
| 2003/0165652 A1 * | 9/2003 | Rivera | B32B 37/223 428/41.8 |

(Continued)

*Primary Examiner* — R. A. Smith
*Assistant Examiner* — John M Royston
(74) *Attorney, Agent, or Firm* — Vorys, Sater, Seymour and Pease LLP; William L. Klima (57) ABSTRACT

Systems and methods relating to improved printable magnetic sheet materials compatible with high-volume roll-to-roll printing processes using roll-fed presses. When implemented, the system permits existing roll-to-roll printer to generate sheet-magnet promotional materials that are adherable to various material substrates, such as, for example, mailers, phone books, etc.

28 Claims, 4 Drawing Sheets

(56) References Cited

U.S. PATENT DOCUMENTS

| | | | |
|---|---|---|---|
| 2004/0185207 A1* | 9/2004 | Trope | B32B 27/08 |
| | | | 428/40.1 |
| 2005/0142341 A1* | 6/2005 | Carls | B44C 1/1704 |
| | | | 428/195.1 |
| 2005/0163980 A1* | 7/2005 | Crum | 428/200 |
| 2008/0217907 A1* | 9/2008 | Dean et al. | 283/82 |
| 2009/0134963 A1* | 5/2009 | Ogden et al. | 335/297 |
| 2012/0037712 A1* | 2/2012 | Fischer | B26D 5/36 |
| | | | 235/493 |

\* cited by examiner

FLEXOGRAPHIC-PRINTABLE MAGNET SYSTEMS

CROSS-REFERENCE TO RELATED APPLICATION

The present application is related to and claims priority from prior provisional application Ser. No. 61/740,246, filed Dec. 20, 2012, entitled "FLEXOGRAPHIC-PRINTABLE MAGNET SYSTEMS"; and, this application is related to and claims priority from prior provisional application Ser. No. 61/815,795, filed Apr. 25, 2013, entitled "FLEXOGRAPHIC-PRINTABLE MAGNET SYSTEMS", the contents of both of which are incorporated herein by this reference and are not admitted to be prior art with respect to the present invention by the mention in this cross-reference section.

BACKGROUND

This invention relates to providing a system for improved printable magnetic sheet materials compatible with high-volume roll-to-roll printing processes using roll-fed presses.

Direct-mail advertising via the postal service, or other delivery services, remains a useful means for communicating with customers. The effectiveness of direct-mail advertising is frequently correlated with the time and frequency of exposure of the customer to the target message. The inclusion of message-imprinted "refrigerator-type" magnets within direct-mail advertising has been shown to increase the effectiveness of the advertising, as customers tend to retain these magnets when compared to other printed media. For this reason, technologies providing improved methods of producing and distributing such products would be of benefit to many.

Flexographic presses and similar "roll-to-roll" printing apparatus are widely implemented in large-volume print production processes. Roll-fed print lines are known to utilize various post-print processing equipment, including, rotary die cutters and label applicators, etc.; however, most roll-to-roll equipment combinations are incapable of processing the type of sheet-feed products commonly used in the production of "refrigerator-type" magnets. For example, a typical roll-to-roll production line is not likely to contain the kinds of stacked-sheet-handling apparatus customarily utilized in lower-volume sheet-fed printing processes (i.e., guillotine shears, sheet tipping and other sheet-handling equipment, etc.).

Modification of equipment to provide additional sheet-handling capabilities within an existing roll-to-roll production line is costly. A means for providing enhanced capabilities within existing roll-to-roll production lines, without costly equipment modifications would be of great benefit to the field.

OBJECTS AND FEATURES OF THE INVENTION

A primary object and feature of the present invention is to provide a system overcoming the above-mentioned problems.

It is a further object and feature of the present invention to provide such a system of materials and methods that, when implemented, permits existing roll-to-roll printer to process pre-magnetized, sheet-magnet materials that are adherable to various material substrates, such as, for example, mailers, phone books, etc.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides an apparatus assisting display of printed indicia on ferromagnetic surfaces, such apparatus compatible with continuous roll-to-roll printing processes, such apparatus comprising: at least one indicia-accepting ferromagnetic displayer configured to assist displaying such printed indicia on the ferromagnetic surfaces; wherein such at least one indicia-accepting ferromagnetic displayer comprises at least one ferromagnetic sheet comprising at least one magnetizable composition configured to provide at least one permanent magnetic field upon magnetization by at least one magnetic-field source, and releasably joined with such at least one ferromagnetic sheet, at least one releasable attacher configured to assist attachment of such at least one indicia-accepting ferromagnetic displayer to another surface; wherein such at least one ferromagnetic sheet comprises at least one first side and at least one second side; wherein such at least one first side comprises at least one printable surface configured to be receptive to applications of printed indicia; wherein such at least one second side comprises at least one protective coating configured to protectively coat such at least one magnetizable composition; wherein such at least one releasable attacher comprises at least one low-tack low-bond-strength adhesive configured to provide low-tack low-bond-strength adhesion with such at least one second side, at least one high-bond-strength adhesive configured to firmly adhere such at least one releasable attacher to such another surface, and at least one intermediate separator layer configured to separate such low-tack low-strength adhesive and such at least one high-bond-strength adhesive, and at least one release liner configured to releasably cover such at least one high-bond-strength adhesive prior to adherence; wherein such at least one ferromagnetic sheet is releasably joined with such at least one releasable attacher; and wherein such at least one ferromagnetic sheet is releasable from such at least one releasable attacher without transfer of adhesive properties.

Moreover, it provides such an apparatus wherein such at least one printable surface comprises at least one indicia-accepting coating. Additionally, it provides such an apparatus, wherein such at least one indicia-accepting coating comprises at least one polymer. Also, it provides such an apparatus, wherein such at least one polymer is selected from the group consisting of polypropylene, polyester, and polyvinyl chloride. In addition, it provides such an apparatus wherein such at least one printable surface comprises at least one indicia-accepting laminated layer. And, it provides such an apparatus wherein such at least one indicia-accepting laminated layer comprises at least one paper. Further, it provides such an apparatus further comprising at least one bonding layer configured to bond such at least one indicia-accepting laminated layer to such at least one magnetizable composition. Even further, it provides such an apparatus wherein such at least one printable surface comprises such at least one magnetizable composition.

Moreover, it provides such an apparatus wherein such at least one printable surface comprises at least one indicia-accepting foil layer. Additionally, it provides such an apparatus wherein such at least one magnetizable composition comprises at least one magnetizable ferromagnetic material combined with at least one flexible binder. Also, it provides such an apparatus wherein such at least one magnetizable ferromagnetic material selected from the group consisting essentially of barium ferrite and strontium ferrite. In addition, it provides such an apparatus, wherein such at least one binder comprises at least one synthetic polymer.

In accordance with another preferred embodiment hereof, this invention provides a method relating to continuous roll-to-roll printing and handling of printable magnetizable sheet compositions comprising the steps of: providing to at least one roll-to-roll printing process, at least one roll of printable magnetizable sheet material; and printing at least one surface of such printable magnetizable sheet material using such at least one roll-to-roll printing process; wherein such printable magnetizable sheet comprises at least one ferromagnetic sheet portion comprising at least one magnetizable composition configured to provide at least one permanent magnetic field upon magnetization by at least one magnetic-field source, and releasably joined with such at least one ferromagnetic sheet portion, at least one releasable attacher configured to assist attachment of such at least one ferromagnetic sheet portion to another surface; wherein such at least one ferromagnetic sheet portion comprises at least one first side and at least one second side; wherein such at least one first side comprises at least one printable surface configured to be receptive to applications of printed indicia; wherein such at least one second side comprises at least one protective coating configured to protectively coat such at least one magnetizable composition; wherein such at least one releasable attacher comprises at least one low-tack low-bond-strength adhesive configured to provide low-tack low-bond-strength adhesion with such at least one second side, at least one high-bond-strength adhesive configured to firmly adhere such at least one releasable attacher to such another surface, and at least one intermediate separator layer configured to separate such low-tack low-strength adhesive and such at least one high-bond-strength adhesive, and at least one release liner configured to releasably cover such at least one high-bond-strength adhesive prior to adherence; and wherein such at least one ferromagnetic sheet portion is releasably joined with such at least one releasable attacher. And, it provides such a method further comprising the step of: in-line die cutting such printable magnetizable sheet to form at least one indicia-printed magnetizable sheet; wherein such at least one release liner remains intact after such in-line die cutting.

Further, it provides such a method further comprising the steps of: removing such at least one release liner from at least one indicia-printed magnetizable sheet to expose such at least one high-bond-strength adhesive; and adhering such at least one indicia-printed magnetizable sheet to at least one target substrate using such at least one high-bond-strength adhesive. Even further, it provides such a method further comprising the prior step of magnetizing such at least one indicia-printed magnetizable sheet.

In accordance with another preferred embodiment hereof, this invention provides an apparatus assisting display of printed indicia on ferromagnetic surfaces, such apparatus comprising: indicia-accepting ferromagnetic displayer means for assisting display of such printed indicia on the ferromagnetic surfaces; wherein such indicia-accepting ferromagnetic displayer means comprises magnetic-field provider means for providing at least one permanent magnetic field upon magnetization by at least one magnetic-field source, and releasably joined with such magnetic-field provider means, releasable attacher means for assisting attachment of such indicia-accepting ferromagnetic displayer means to another surface; wherein such magnetic-field provider means comprises a sheet having at least one first side and at least one second side; wherein such at least one first side comprises print-receptive surface means for receiving applications of printed indicia; wherein such at least one second side comprises protective coating means for protectively coating such magnetic-field provider means; wherein such releasable attacher means comprises low-tack low-bond-strength adherer means for providing low-tack low-bond-strength adhesion with such at least one second side, high-bond-strength adherer means for firmly adhering such releasable attacher means to such another surface, and intermediate separator means for separating such low-tack low-strength adherer means and such high-bond-strength adherer means, and release liner cover means for releasably covering such high-bond-strength adherer means prior to adherence; wherein such magnetic-field provider means releasably joined with such releasable attacher means; and wherein such magnetic-field provider means is releasable from such releasable attacher means without transfer of adhesive properties.

Even further, it provides such an apparatus wherein such print-receptive surface means comprises at least one indicia-accepting coating. Even further, it provides such an apparatus, wherein such at least one indicia-accepting coating comprises at least one polymer. Even further, it provides such an apparatus wherein such print-receptive surface means comprises at least one indicia-accepting laminated layer. Even further, it provides such an apparatus wherein such at least one indicia-accepting laminated layer comprises at least one paper. Even further, it provides such an apparatus further comprising at least one bonding layer configured to bond such at least one indicia-accepting laminated layer to such at least one magnetizable composition. Even further, it provides such an apparatus wherein such print-receptive surface means comprises such at least one magnetizable composition. Even further, it provides such an apparatus wherein such at least one magnetizable composition comprises at least one magnetizable ferromagnetic material combined with at least one flexible binder. In accordance with preferred embodiments hereof, this invention provides each and every novel feature, element, combination, step and/or method disclosed or suggested by this patent application.

DETAILED DESCRIPTION OF THE BEST MODES AND PREFERRED EMBODIMENTS OF THE INVENTION

Figure 1:
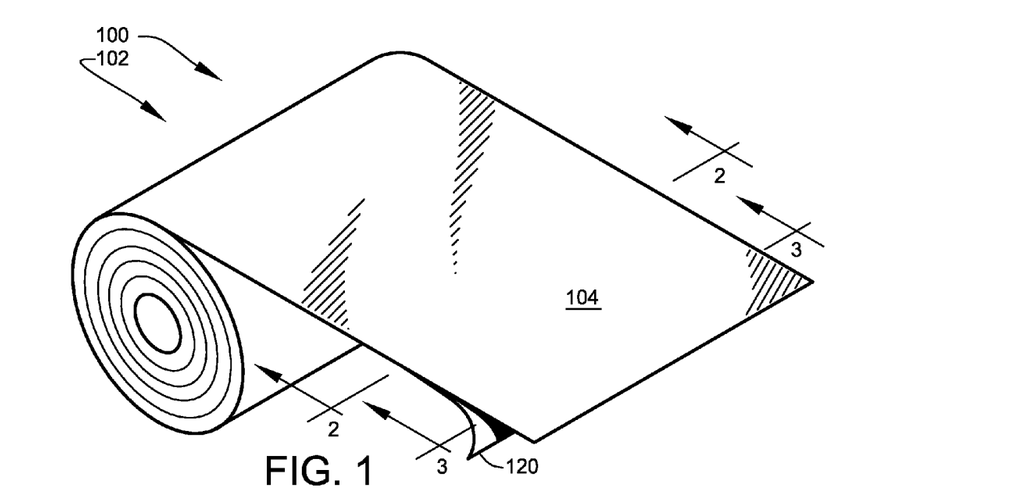
FIG. 1 shows a perspective view, illustrating a printable magnetizble sheet of a flexographic-printable magnet system, according to a preferred embodiment of the present invention.
Figure 2:
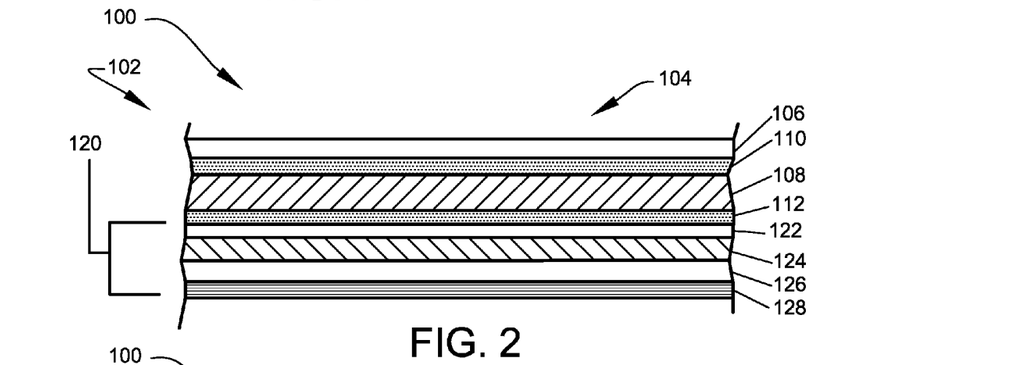
FIG. 2 shows the sectional view 2-2 of FIG. 1 according to the preferred embodiment of FIG. 1.

FIG. 1 shows a perspective view, illustrating a printable ferromagnetic sheet 102 of flexographic-printable magnet system 100, according to a preferred embodiment of the present invention. FIG. 2 shows the sectional view 2-2 of FIG. 1 according to the preferred embodiment of FIG. 1. In reference to the above-noted figures, printable ferromagnetic sheet 102 preferably comprises an improved magnet/label material, which is preferably configured to allow the material to be processed on conventional high-volume roll-to-roll flexographic print equipment, such that direct-mail distributed magnetic advertising is produced. Such direct-mail distributed magnetic advertising includes a diverse range of magnetic products, including but not limited to, postcards, refrigerator magnets, business-card magnets, calendars, collectibles, craft magnets, displays, hobbies, novelties, reminders, sales promotions, sports schedules, etc. Applicant's preferred printable ferromagnetic sheet 102 consists of multiple lamina combined to form a rolled sheet stock 104 capable of being processed into adherable labels containing flexible printed magnets 101 (see FIG. 6).

Figure 3:
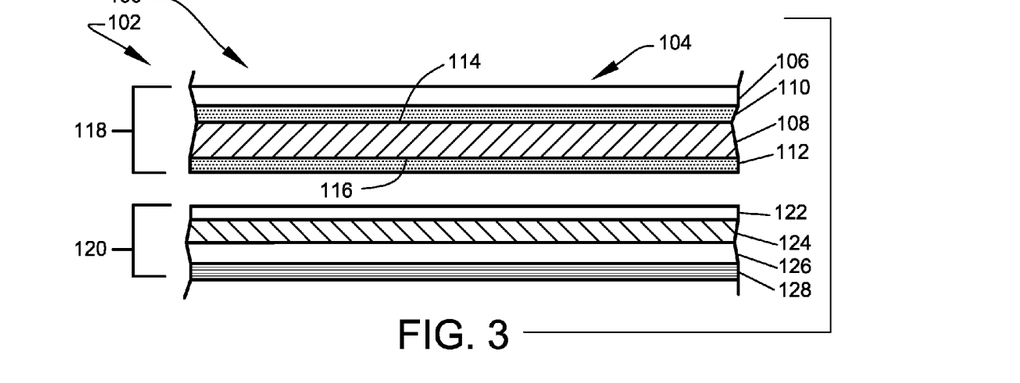
FIG. 3 shows the sectional view 3-3 of FIG. 1, illustrating a printable magnet portion separated from a special multi-layer-adhesive backing, according to the preferred embodiment of FIG. 1.

FIG. 3 shows the sectional view 3-3 of FIG. 1, illustrating the preferred lamina of printable ferromagnetic sheet 102. Referring to both FIG. 1 and FIG. 3, printable ferromagnetic sheet 102 preferably comprises two principal sub-portions identified herein as printable magnet portion 118 and a multilayer-adhesive backing 120, as shown. Printable magnet portion 118 is preferably capable of exhibiting a magnetic attraction to ferromagnetic surfaces 103 (see FIG. 6), such as refrigerator doors, filing cabinets, etc. Printable magnet portion 118 is removably coupled with multilayer-adhesive backing 120 that is preferably designed to enable printable magnet portion 118, in the form of flexible printed magnets 101, to be attached to distributable consumer items 105, such as, for example, periodicals, mailers, brochures, etc, and subsequently removed from such consumer items for use as promotional and/or informational "refrigerator-type" magnets. Thus, multilayer-adhesive backing 120 at least embodies herein at least one releasable attacher configured to assist attachment of such at least one indicia-accepting ferromagnetic sheet to another surface.

Referring again to the sectional views of both FIG. 2 and FIG. 3, printable magnet portion 118 preferably comprises printable layer 106, magnetic layer 108, and protective back coating 112, as shown. For the purpose of description, magnetic layer 108 will be described as having a first side 114 and second side 116, as shown (at least embodying herein wherein such magnetic-field provider means comprises a sheet having at least one first side and at least one second side). Printable layer 106 is preferably located at the (upper-outer) first side 114 of magnetic layer 108, as shown, with protective back coating 112 preferably located adjacent the opposing (lower-inner) second side 116, as shown (at least embodying herein wherein such at least one first side comprises print-receptive surface means for receiving applications of printed indicia and wherein such at least one second side comprises protective coating means for protectively coating such magnetic-field provider means).

Preferably, the ferromagnetic composition of magnetic layer 108 is distributed in a pre-magnetized state. Alternately preferably, printable magnet portion 118 comprises a composition that is capable of post-press (printing) magnetization on upon exposure to at least one magnetic-field source.

Printable layer 106 preferably comprises a surface receptive to printing, more preferably to flexographic and similar roll-to-roll printing processes. The resulting printed products may be used to display promotional advertising, informational, decorative, or other printed indicia (at least embodying herein at least one indicia-accepting ferromagnetic sheet configured to assist displaying such printed indicia on the ferromagnetic surfaces and indicia-accepting ferromagnetic sheet means for assisting display of such printed indicia on the ferromagnetic surfaces). Printable layer 106 preferably comprises at least one type of printable surfaces listed in Table 1 below.

TABLE 1

| Types of printable layer compositions | |
|---|---|
| Printable Layer Composition | Example Materials |
| 1) Indicia-accepting foil layer | Printable metallic foils (Hazen Paper Company of Holyoke, MA) |
| 2) Indicia-accepting coating | polypropylene, polyester, polyvinyl chloride |
| 3) Indicia-accepting laminated layer | gloss or matte paper, gloss or matte vinyl, polypropylene, films |
| 4) Indicia-accepting formulation of magnetic layer surface | Titanium Dioxide admixture within magnetic layer 108 |

It is noted that, most preferred embodiments of printable magnet portion 118 comprise an additional bonding layer 110, which preferably assists in forming a permanent bond between printable layer 106 and magnetic layer 108. Upon reading this specification, those with ordinary skill in the art will now appreciate that, under appropriate circumstances, considering such issues as intended use, user preferences, marketing preferences, cost, printing requirements, available materials, technological advances, etc., other printable-surface arrangements such as, for example, specialty films, write-on/wipe-off surfaces, etc., may suffice.

When printable layer 106 comprises a pre-formed material, such as a paper or pre-formed film, bonding layer 110 preferably comprises a permanent bonding adhesive. Alternately preferably, bonding layer 110 comprises an adhesion-enhancing surface treatment and/or "tie coat" material when printable layer 106 is formed by an applied coating. Upon reading this specification, those with ordinary skill in the art will now appreciate that, under appropriate circumstances, considering such issues as material compatibilities, cost, structural requirements, technological advances, etc., other bonding arrangements such as, for example, utilization of surface activation and tie coats in combination with adhesives, etc., may suffice.

Applicant's preferred multilayer-adhesive backing 120 preferably comprises a two-sided adhesive carrier sheet 124 preferably supporting a low-tack adhesive 122 and an opposing high-bond-strength adhesive 126, as shown (such adhesive carrier sheet 124 at least embodying herein at least one intermediate separator layer configured to separate such clean-release low-strength adhesive and such at least one high-bond-strength adhesive and at least embodying herein intermediate separator means for separating such clean-release low-strength adherer means and such high-bond-strength adherer means). In addition, an adhesive liner, most preferably a tear-resistant liner 128, is preferably applied over high-bond-strength adhesive 126, as shown. Preferably, the tear resistant liner is removable from permanent adhesive 126 allowing the entire magnet/label assembly to be applied to a selected substrate (at least embodying herein at least one release liner configured to releasably cover such at least one high-bond-strength adhesive prior to adherence).

Low-tack adhesive 122 preferably comprises at least one composition providing a "repositionable" adhering property (at least embodying herein releasable attacher means for assisting attachment of such indicia-accepting ferromagnetic sheet means to another surface). This preference enables printable magnet portion 118 (from backcoating 112 up) to be separated from multilayer-adhesive backing 120 and re-applied to a ferromagnetic substrate. Low-tack adhesive 122 preferably comprises a low-bond-strength adhesive configured to provide releasable adhesion between second side 116 of printable magnet portion 118 (at least embodying herein at least one low-tack low-bond-strength adhesive configured to provide low-tack low-bond-strength adhesion with such at least one second side). Preferred low-tack adhesives 122 include pressure sensitive adhesives capable of releasing cleanly from the adhered-to surface without a transfer of adhesive residue (at least embodying herein wherein such at least one ferromagnetic sheet is releasable from such at least one releasable attacher without transfer of adhesive properties). Upon reading this specification, those with ordinary skill in the art will now appreciate that, under appropriate circumstances, considering such issues as intended use, user preferences, marketing preferences, cost, structural requirements, available materials, technological advances, etc., other adhesive arrangements such as, for example, the use of fugitive-type adhesive (i.e., hot-melt polyalphaolefins), etc., may suffice.

Permanent adhesive 126 preferably comprises a pressure-sensitive adhesive capable of forming a permanent or semi-permanent bond with a selected substrate. Permanent adhesive 126 preferably comprises a rubber or acrylic composition.

In the sectional view depicted in FIG. 2, printable ferromagnetic sheet 102 is shown in the initial joined configuration with second side 116 of printable magnet portion 118 in adhesive contact with low-tack adhesive 122 of multi-layer-adhesive backing 120 (at least embodying herein wherein such at least one ferromagnetic sheet is releasably joined with such at least one releasable attacher). In the depiction of FIG. 3, printable ferromagnetic sheet 102 is shown in a released configuration wherein the upper printable magnet portion 118 as been separated from the lower multilayer-adhesive backing 120.

Magnetizable layer 108 is preferably constructed of at least one flexible magnetizable material, preferably allowing magnetization of the material by an external magnetic field, such material preferably remaining magnetized after the external field is removed (at least embodying herein magnetic-field provider means for assisting display of such printed indicia on the ferromagnetic surfaces). The magnetizable material preferably comprises ferrous particles. Preferred flexible magnetizable materials preferably comprise a homogenous mixture of pulverized ceramic ferrite and at least one binding material. Such binding material preferably imparts to magnetizable layer 108, at least the properties of shape retention and flexibility.

In the preferred set of chemical formulations for magnetizable layer 108, the magnetizable ceramic ferrite preferably comprises ferrite powder, preferably strontium ferrite powder ($SrFe_{12}O_{19}$), alternately preferably barium ferrite powder ($BaFe_{12}O_{19}$). A preferred source of ferrite powder is Hoosier Magnetics, Inc. located in Ogdensburg, N.Y. (product number HM 410) http://www.hoosiermagneticsinc.com/index.html). Alternately preferably, another ferrite powder is obtained in a recycled-powder form from TDK Corporation (http://www.tdk.com/). Upon magnetization with a magnetic field source, magnetizable layer 108 preferably produces a permanent magnetic field and preferably provides magnetizable layer 108 with magnetic properties.

Preferred binding materials include synthetic polymers, with thermoplastic binders being preferred. Magnetizable layer 108 may be formed by passing a granulated homogenous mixture of pulverized ceramic ferrite and polymer through a calendering nip where it is preferably formed into a sheet having a predetermined thickness and width. Alternately preferably, magnetizable layer 108 may be formed by an extrusion process followed by calendering. The typical physical properties of preferred magnet compositions include a shore hardness of about D60, a specific gravity of about 3.5, material shrinkage of about <1.5% @ 158° F. (70° C.), 7 days, tensile strength of about 700 pounds per square inch (49 kg/cm2), and a flexibility permitting the material to be coiled to about a ½" (12.7 mm) radius without cracking at 68° F. (20° C.). When magnetized, magnetizable layer 108 preferably comprises a magnetic energy of at least 1.0 MGOe (Megagauss Oersted), preferably about 1.7 MGOe.

Back coating 112 preferably functions as a physical barrier to prevent migration of the inherently dark ferrite powder from the binder of printable magnet portion 118 to the surfaces to which the magnets are adhered. Without such back coating, migration of ferrite powders can sometimes produce non-removable stains in painted metal surfaces. Applicant's preferred back coating produces strong cross linking with magnetizable layer 108 thus retaining protective properties even after repeated cycles of installation and removal. Preferred formulations of back coating 112 also assists in printing and handling processes by reducing blocking issues that are sometimes experienced on long rolls of plain magnet or thick stacks of cut sheets.

Figure 4:
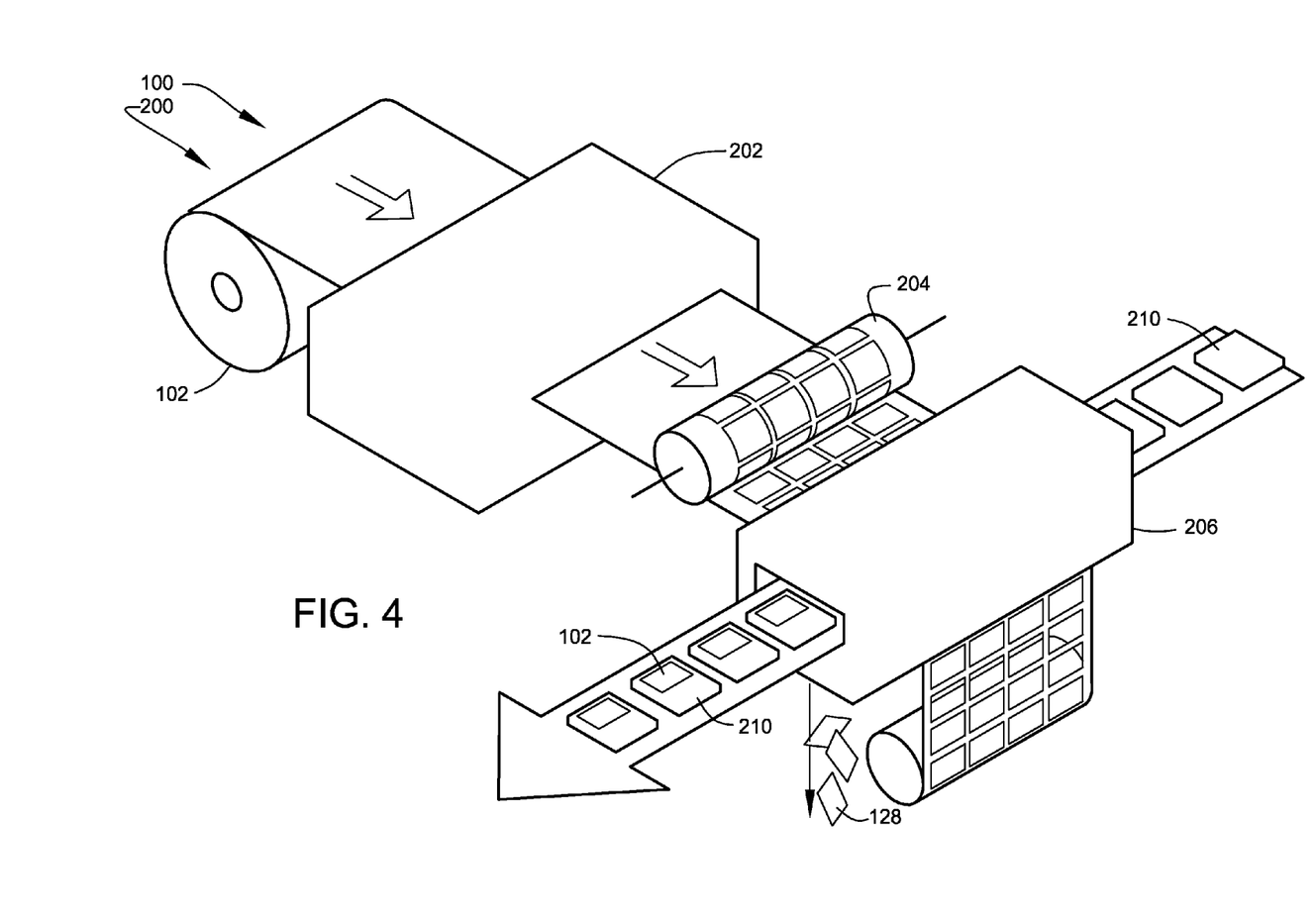
FIG. 4 shows a diagram illustrating a preferred roll-to-roll printing and handling process, according to a preferred embodiment of the present invention.

Printable ferromagnetic sheet 102 preferably comprises sheet properties permitting print processing of the material within roll-to-roll printing presses, such as, for example flexographic-type printing presses. FIG. 4 shows a diagram illustrating a preferred roll-to-roll printing and handling process 200, according to a preferred embodiment of the present invention. In preferred use, a roll-to-roll print operator mounts a roll of printable ferromagnetic sheet 102 to roll-to-roll printing press 202. Next, the printable ferromagnetic sheet 102 is printed and then die cut using an in-line rotary die cutter 204, as shown. Preferably, printable printable ferromagnetic sheet 102 is "kiss cut" through all upper material layers leaving the tear-resistant liner 128 intact. Next, the die-cut material is transferred to label applicator 206 which peels away the tear-resistant liner 128 and adheres the permanent adhesive 126 to a target substrate 210 (i.e., phonebook, magazine, packaging etc.) preferably, printable printable ferromagnetic sheet 102 is pre-magnetized prior to printing.

Figure 5:
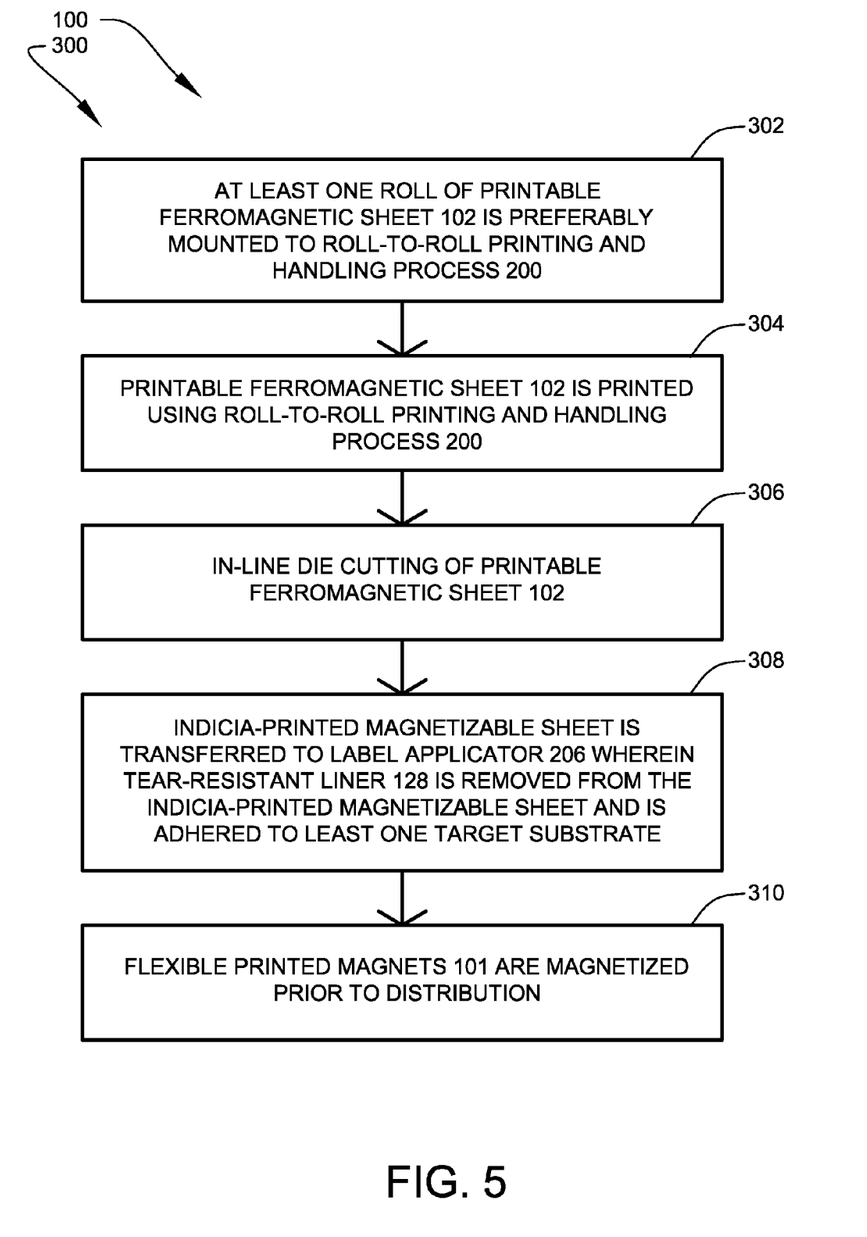
FIG. 5 shows a flow diagram of preferred steps of a method of producing and distributing adherable labels containing flexible printed magnets, according to the present invention.

FIG. 5 shows a flow diagram of preferred steps of method 300 of producing and distributing adherable labels containing flexible printed magnets 101, according to the present invention. In this regard, preferred method 300 of flexographic-printable magnet system 100 is implemented using following set of preferred steps. First, as indicated preferred step 302, at least one roll of printable ferromagnetic sheet 102 is preferably mounted to roll-to-roll printing and handling process 200. Next, as indicated in preferred step 304, printable layer 106 of printable ferromagnetic sheet 102 is printed using roll-to-roll printing and handling process 200. It is noted that printable ferromagnetic sheet 102 comprises the material arrangements described above, including the use of protective back coatings 112 and tear-resistant liners 128.

In addition, method 300 further comprises the preferred step 306 of in-line die cutting printable ferromagnetic sheet 102 to form at least one indicia-printed magnetizable sheet containing flexible printed magnets 101. It is noted that, tear-resistant liner 128 remains intact after such in-line die cutting. Next, as indicated in preferred step 308, the indicia-printed magnetizable sheet containing flexible printed magnets 101 is preferably transferred to a label applicator 206 wherein tear-resistant liner 128 is removed from the indicia-printed magnetizable sheet to expose permanent adhesive 126 (at least embodying herein high-bond-strength adhesive and at least embodying herein high-bond-strength adherer means for firmly adhering such releasable attacher means to such another surface). Preferably, indicia-printed magnetizable sheet containing flexible printed magnets 101 is adhered to least one target substrate using such permanent adhesive 126. Finally, if magnetizable layer 108 is not premagnized, flexible printed magnets 101 are magnetized prior to distribution the end users, as indicated in preferred step 310.

Figure 6:
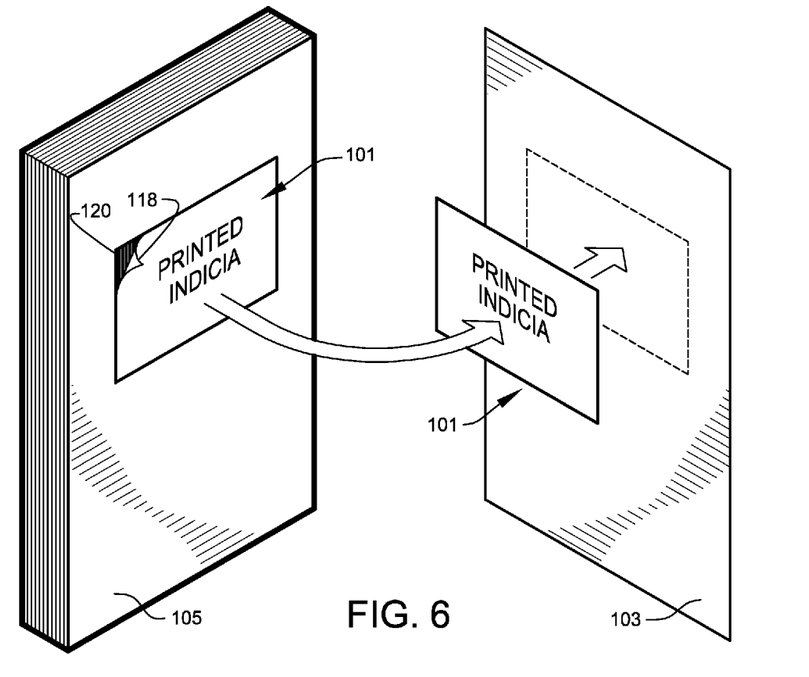
FIG. 6 shows a perspective view, diagrammatically illustrating transfer of the printable magnetizble sheet from a delivery substrate to a ferromagnetic surface, according to the preferred embodiment of FIG. 1.

FIG. 6 shows a perspective view, diagrammatically illustrating transfer of the printable magnetizble sheet from a delivery substrate to a ferromagnetic surface, according to the preferred embodiment of FIG. 1. The end-user would receive, for example, a magazine containing the printed magnetizable sheet composition of 102 adhered thereon. The system arrangements allow the user to remove the printed magnet assembly from the magazine by separating the printed magnet assembly from the low-tack adhesive 122 (at least embodying herein low-tack low-bond-strength adherer means for providing low-tack low-bond-strength adhesion with said at least one second side). The user may then apply the printed magnet assembly to a ferromagnetic surface, such as, for example, a refrigerator door.

It is noted that Applicant's described composition enables the roll-to-roll print operator to produce the above-described product using entirely "industry-standard" roll-to-roll equipment combinations.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A continuous printable ferromagnetic multi-layer sheet compatible with a continuous roll-to-roll printing process, the continuous printable ferromagnetic multi-layer sheet convertible by cutting the continuous printable ferromagnetic multi-layer sheet entirely through a thickness of the continuous printable ferromagnetic multi-layer sheet into printed magnet labels each comprising a printed magnet configured to be attachable to a ferromagnetic surface, said continuous printable ferromagnetic multi-layer sheet comprising:

a continuous printable magnetic portion configured to be compatible with the continuous roll-to-roll printing process, said continuous printable magnetic portion comprising:

a magnetic layer configured to be magnetizable;

a printable layer applied to an upper side of the magnetic layer; and         a protective layer applied to a lower side of the magnetic layer, said protective layer configured to remain connected to said magnetic layer when the continuous printable magnetic portion is converted into printed magnets and applied to the ferromagnetic surface;

a continuous multi-layer adhesive backing portion configured to be compatible with the continuous roll-to-roll printing process, said continuous multi-layer adhesive backing portion releasably adhered to a lower side of the continuous printable magnetic portion, said continuous multi-layer adhesive backing portion comprising:

a carrier layer;

a low-tack adhesive layer applied to an upper side of said carrier layer for releasably adhering the continuous printable magnetic portion to the continuous multi-layer adhesive backing portion; and         a high-tack adhesive layer applied to a lower side of said carrier layer, said high-tack adhesive layer configured to securely adhere the converted printed magnet labels to a surface of an object or item,     wherein said low-tack adhesive layer provides low-bond-strength adhesion between said continuous printable magnetic portion and said continuous multi-layer adhesive backing portion of each printed magnet label,     wherein said high-tack adhesive layer provides high-bond-strength adhesion between said continuous multi-layer adhesive backing portion of each printed magnet label and the surface of the object or item, and     wherein said continuous printable ferromagnetic multi-layer sheet is configured so that each said printed magnet label converted from said continuous printable ferromagnetic multi-layer sheet can be applied to the surface of the object or item and then said printed magnet can be releasably separated from said continuous multi-layer adhesive backing portion while said continuous multi-layer adhesive backing portion remains adhered to the surface of the object or item.

2. The sheet according to claim 1, wherein said printable layer comprises at least one indicia-accepting coating applied to the upper side of said magnetic layer.

3. The sheet according to claim 2, wherein said at least one indicia-accepting coating comprises at least one polymer.

4. The sheet according to claim 3, wherein said at least one polymer is selected from the group consisting of polypropylene, polyester, and polyvinyl chloride.

5. The sheet according to claim 1, wherein said printable layer comprises at least one indicia-accepting laminated layer.

6. The sheet according to claim 5, wherein said at least one indicia-accepting laminated layer comprises at least one paper layer.

7. The sheet according to claim 5, further comprising at least one bonding layer configured to bond said at least one indicia-accepting laminated layer to said magnetic layer.

8. The sheet according to claim 1, wherein said magnetic layer comprises at least one magnetizable composition.

9. The sheet according to claim 1, wherein said printable layer comprises at least one indicia-accepting foil layer.

10. The sheet according to claim 1, wherein said magnetic layer comprises at least one magnetizable ferromagnetic material combined with at least one flexible binder.

11. The sheet according to claim 10 wherein said at least one magnetizable ferromagnetic material is selected from the group consisting essentially of barium ferrite and strontium ferrite.

12. The sheet according to claim 10, wherein said at least one binder comprises at least one synthetic polymer.

13. The sheet according to claim 1, further comprising a releasable liner or layer applied to a lower surface of the high-tack adhesive layer.

14. A printed magnet label converted from a continuous printable ferromagnetic multi-layer sheet compatible with a continuous roll-to-roll printing process, the continuous printable ferromagnetic multi-layer sheet convertible by printing labels on the continuous printable ferromagnetic multi-layer sheet and then cutting the continuous printable ferromagnetic multi-layer sheet entirely through a thickness of the continuous printable ferromagnetic multi-layer sheet to form printed magnet labels comprising detachable printed magnets configured to be reattachable to a ferromagnetic surface, the printed label comprising:
 a printed magnet portion, comprising:
  a magnet layer;
  a printed layer applied to an upper side of the magnet layer; and
  a protective layer applied to a lower side of the magnet layer;
 a multi-layer adhesive backing portion, comprising:
  a carrier layer;
  a low-tack adhesive layer applied to an upper side of the carrier layer; and
  a high-tack adhesive layer applied to a lower side of the carrier layer,
 wherein the printed magnet label is configured so that the printed magnet label can be adhered to a surface of an object and then the printed magnet can be releasably separated from the printed magnet label while the multi-layer adhesive backing multi-layer sheet remains attached to the surface of the object or item, and
 wherein the low-tack adhesive layer remains attached to a lower side of the protective layer after the printed magnet is releasably separated from the multi-layer adhesive backing portion assisting attachment of each printed magnet to the surface of the object or item.

15. The sheet according to claim 14, wherein the printable layer comprises at least one indicia-accepting coating.

16. The sheet according to claim 15, wherein said at least one indicia-accepting coating comprises at least one polymer.

17. The sheet according to claim 14, wherein said printable layer comprises at least one indicia-accepting laminated layer.

18. The sheet according to claim 17, wherein said at least one indicia-accepting laminated layer comprises at least one paper layer.

19. The sheet according to claim 18, further comprising at least one bonding layer configured to bond said at least one indicia-accepting laminated layer to said magnetic layer.

20. The sheet according to claim 14, wherein said magnetic layer comprises at least one magnetizable composition.

21. The sheet according to claim 20, wherein said at least one magnetizable composition comprises at least one magnetizable ferromagnetic material combined with at least one flexible binder.

22. A method of converting a continuous printable magnetizable multi-layer sheet into printed magnet labels, said printable magnetizable multi-layer sheet being compatible with a continuous roll-to-roll printing process, the method comprising the steps of:
 providing a roll of the continuous printable magnetizable multi-layer sheet having a first side and a second side, said first side having a printable surface configured to be receptive to applications of printed indicia and said second side having a protective coating, said continuous printable magnetizable multi-layer sheet comprising:
  a continuous printable magnetic portion, comprising:
   a magnet layer;
   a printed layer applied to an upper side of the magnet layer; and
   a protective layer applied to a lower side of said magnet layer; and
  a continuous multi-layer adhesive backing releasably attached to said continuous printable magnetic portion, the continuous multi-layer adhesive backing comprising:
   a carrier layer;
   a low-tack adhesive layer applied to an upper side of said carrier layer; and
   a high-tack adhesive layer applied to a lower side of said carrier layer;
 printing labels onto said continuous printable magnetizable multi-layer sheet; and
 cutting said continuous printable magnetizable multi-layer sheet entirely through a thickness of said continuous printable magnetizable multi-layer sheet to make the printed magnet labels,
 wherein the printed magnet labels are configured so that said high tack adhesive layer of each printed magnet label can be applied to a surface of an object and then each printed magnet portion can be releasably separated from each printed magnet label while the multi-layer adhesive backing of each printed magnet label remains attached to the surface of the object,
 wherein the low-tack adhesive layer remains attached to a lower side of the protective layer after the printed magnet portion is releasably separated from the multi-layer adhesive backing portion assisting attachment of each printed magnet to the surface of the object or item, and
 wherein the low-tack adhesive layer comprises at least one composition providing a repositionable adhering property.

23. The method according to claim 22, wherein the cutting step occurs by in-line die cutting the continuous printable magnetizable sheet to form the printed magnet labels, and wherein a lower surface of the high-tack adhesive is provided with a release liner that remains intact after said step of in-line die cutting.

24. The method according to claim 23, further comprising the steps of:
 removing the release liner from each printed magnet label to expose the high tack adhesive layer, and adhering each printed magnet label to the surface of the object using the high tack adhesive layer.

25. The method according to claim 24, further comprising the prior step of magnetizing the continuous printable magnetizable multi-layer sheet.

26. A printed magnetic label, comprising:
 a printed magnet, comprising:
  a magnet layer;
  a printed layer applied to an upper side of the magnet layer; and a protective layer applied to a lower side of the magnet layer;
a multi-layer adhesive backing, comprising:
a carrier layer;
a low-tack adhesive layer applied to an upper side of the carrier layer; and
a high-tack adhesive layer applied to a lower side of the carrier layer,
wherein the printed magnet label is configured so that the printed magnet label can be applied to a surface of an object or item and then the printed magnet can be releasably separated from the printed magnet label while the multi-layer adhesive backing portion remains attached to the surface of the object or item,
wherein the low-tack adhesive layer remains attached to a lower side of the protective layer after the printed magnet is releasably separated from the multi-layer adhesive backing portion assisting attachment of each printed magnet to the surface of the object or item, and
wherein the low-tack adhesive layer comprises at least one composition providing a repositionable adhering property.

27. The sheet according to claim 1, wherein the low-tack adhesive layer remains attached to a lower side of the protective layer after the printed magnet portion is releasably separated from the multi-layer adhesive backing portion assisting attachment of each printed magnet to the surface of the object or item.

28. A continuous printable ferromagnetic multi-layer sheet compatible with a continuous roll-to-roll printing process, the continuous printable ferromagnetic multi-layer sheet convertible by cutting the continuous printable ferromagnetic multi-layer sheet entirely through a thickness of the continuous printable ferromagnetic multi-layer sheet into printed magnet labels each comprising a printed magnet configured to be attachable to a ferromagnetic surface, said continuous printable ferromagnetic multi-layer sheet comprising:
a first sheet portion comprising a continuous printable magnetic portion configured to be compatible with the continuous roll-to-roll printing process, said continuous printable magnetic portion comprising:
a magnetic layer configured to be magnetizable;
a printable layer applied to an upper side of the magnetic layer; and
a protective layer applied to a lower side of the magnetic layer, said protective layer configured to remain connected to said magnetic layer when the continuous printable magnetic portion is converted into printed magnets and applied to the ferromagnetic surface; and
a second sheet portion releasably adhered to the first sheet portion, the second sheet portion comprising a continuous multi-layer adhesive backing portion configured to be compatible with the continuous roll-to-roll printing process, said continuous multi-layer adhesive backing portion releasably adhered to a lower side of the continuous printable magnetic portion, said continuous multi-layer adhesive backing portion comprising:
a carrier layer;
a low-tack adhesive layer applied to an upper side of the carrier layer for releasably adhering the continuous printable magnetic portion to the continuous multi-layer adhesive backing portion; and
a high-tack adhesive layer applied to a lower side of said carrier layer, said high-tack adhesive layer configured to securely adhere the converted printed magnet labels to a surface of an object or item,
wherein said low-tack adhesive layer provides low-bond-strength adhesion between said continuous printable magnetic portion and said continuous multi-layer adhesive backing portion of each printed magnet label,
wherein said high-tack adhesive layer provides high-bond-strength adhesion between said continuous multi-layer adhesive backing portion of each printed magnet label and the surface of the object or item,
wherein said continuous printable ferromagnetic multi-layer sheet is configured so that each said printed magnet label converted from said continuous printable ferromagnetic multi-layer sheet can be applied to the surface of the object or item and then said printed magnet can be releasably separated from said continuous multi-layer adhesive backing portion while said continuous multi-layer adhesive backing portion remains adhered to the surface of the object or item, and
wherein each said printed magnet label is adhered to the object or item by both magnetic adhesion provided by said magnetic layer and low-bond strength adhesion provided by said low-tack adhesive layer of said second sheet portion.

* * * * *